United States Patent
Wang et al.

(10) Patent No.: US 9,791,056 B2
(45) Date of Patent: Oct. 17, 2017

(54) ENERGY-RECYCLING HYDRAULIC CONTROL MAIN VALVE

(71) Applicant: JIANGSU HENGLI HYDRAULIC CO., LTD, Changzhou, Jiangsu (CN)

(72) Inventors: Liping Wang, Jiangsu (CN); Qiang Lu, Jiangsu (CN); Zhan Chen, Jiangsu (CN); Hongguang Liu, Jiangsu (CN); Guoliang Zhang, Jiangsu (CN)

(73) Assignee: JIANGSU HENGLI HYDRAULIC TECHNOLOGY CO., LTD., Changzhou (CN)

( * ) Notice: Subject to any disclaimer, the term of this patent is extended or adjusted under 35 U.S.C. 154(b) by 167 days.

(21) Appl. No.: 14/818,331

(22) Filed: Aug. 5, 2015

(65) Prior Publication Data

US 2015/0337970 A1 Nov. 26, 2015

Related U.S. Application Data

(63) Continuation of application No. PCT/CN2013/001430, filed on Nov. 22, 2013.

(30) Foreign Application Priority Data

Aug. 19, 2013 (CN) .......................... 2013 1 0363059
Aug. 19, 2013 (CN) ..................... 2013 2 0505987 U

(51) Int. Cl.
  *F16K 11/06* (2006.01)
  *F16K 11/07* (2006.01)
  *F15B 13/04* (2006.01)

(52) U.S. Cl.
  CPC .......... *F16K 11/06* (2013.01); *F15B 13/0403* (2013.01); *F16K 11/0716* (2013.01);
  (Continued)

(58) Field of Classification Search
  CPC ..... Y10T 137/86493; Y10T 137/86702; Y10T 137/8671; Y10T 137/86694;
  (Continued)

(56) References Cited

U.S. PATENT DOCUMENTS 2,946,347 A * 7/1960 Ruhl ....................... F15B 13/04
                                                    137/596.2
2,965,133 A * 12/1960 Rice ........................ F15B 13/04
                                                    137/596.2
(Continued)

FOREIGN PATENT DOCUMENTS

CN          201306326 Y          9/2009

OTHER PUBLICATIONS

International Search Report of PCT Patent Application No. PCT/CN2013/001430 dated May 16, 2014.

*Primary Examiner* — Kevin Murphy
*Assistant Examiner* — Kelsey Rohman

(57) ABSTRACT

Disclosed is an energy-recycling hydraulic control main valve, which is provided with end covers, a valve core, a left one-way valve and a right one-way valve; the left one-way valve is composed of a left valve seat, a left cone valve core and a left spring; a conical surface of the left cone valve core is closely attached to a left conical surface of the valve core by the spring force; the right one-way valve is composed of a right valve seat, a right cone valve core and a right spring; and a conical surface of the right cone valve core is closely attached to a right conical surface of the valve core by spring force. The hydraulic main control valve can not only limit the falling speed of a piston, but use the potential energy generated by the gravity action on the piston, thereby achieving energy recycling.

4 Claims, 7 Drawing Sheets

(52) U.S. Cl.
CPC .......... *Y10T 137/86493* (2015.04); *Y10T 137/86702* (2015.04)

(58) Field of Classification Search
CPC ........... Y10T 137/8667; F15B 13/0403; F15B 13/0402; F15B 2211/46; F16K 11/06; F16K 11/0712; F16K 11/0716
USPC .... 137/625.68, 625.69, 625.67, 625.25, 102; 91/449, 450
See application file for complete search history.

(56) References Cited

U.S. PATENT DOCUMENTS 3,779,136 A * 12/1973 Hohlein .................. F15B 11/08
 91/361
6,305,264 B1 * 10/2001 Yang .................... F15B 11/042
 91/447

\* cited by examiner

ENERGY-RECYCLING HYDRAULIC CONTROL MAIN VALVE

CROSS REFERENCE TO RELATED APPLICATIONS

The present application is a Continuation Application of PCT application No. PCT/CN2013/001430 filed on Nov. 22, 2013, which claims the benefits of Chinese Patent Application No. 201310363059.2 filed on Aug. 19, 2013 and Chinese Utility Model Application No. 201320505987.3 filed on Aug. 19, 2013. All the above are hereby incorporated by reference.

FIELD OF THE INVENTION

The present disclosure generally relates to a hydraulic control main valve, and more particularly, to an energy-recycling hydraulic control main valve.

BACKGROUND OF THE INVENTION

When a valve core of a conventional hydraulic control main valve is switched to the R position during the use of the hydraulic control main valve, a piston of the hydraulic control main valve will move downward at acceleration under the gravity action of the mechanism and the material on the piston. On the one hand, the oil fluid in the piston chamber will be discharged rapidly; and on the other hand, when the piston is moving downward at acceleration, the flow to the non-rod chamber cannot be satisfied in time, so the piston falls in a unrestricted way and insufficient oil is fed into the rod chamber of the oil cylinder to cause a vacuum, which are unfavorable.

SUMMARY OF THE INVENTION

An objective of the present disclosure is to provide an energy-recycling hydraulic control main valve, which can limit the falling speed of a piston and utilize the potential energy generated by the gravity action of the mechanism and the material on the piston, thereby overcoming the drawbacks of the prior art.

To achieve the aforesaid objective of the present disclosure, one technical solution is as follows: an energy-recycling hydraulic control main valve is provided, which comprises end covers, a valve core, a left one-way valve and a right one-way valve; wherein each of two ends of the valve core is provided with one end cover, the valve core is provided with a left oil port T, a first oil port A, a second oil port I/L, a third oil port I/M, a fourth oil port I/R, a fifth oil port B, a right oil port T and a sixth oil port P thereon; a spring and a spring seat are arranged between each of the end covers and the valve core; the left one-way valve and the right one-way valve are respectively embedded in the left end and the right end of the valve core; the left one-way valve is composed of a left valve seat, a left cone valve core and a left spring; a conical surface of the left cone valve core is closely attached to a left conical surface of the valve core by the action of the left spring; the right one-way valve is composed of a right valve seat, a right cone valve core and a right spring; and a conical surface of the right cone valve core is closely attached to a right conical surface of the valve core by the action of the right spring.

A left first central hole and a right first central hole are symmetrically disposed on the central line of the valve core described in the aforesaid technical solution; the two first central holes are in communication with each other via a second central hole, and frustum holes are respectively formed at junctions of the second central hole and each of the first central holes; a left oil-feeding throttling groove and a right oil-feeding throttling groove are disposed between the oil port P and the oil port I/M; a left throttling groove is disposed between the oil port A and the oil port I/L; a left oil-returning hole assembly composed of a left first throttling hole, a left second throttling hole and a left third throttling hole is disposed between the left oil port T and the oil port I/L; the left second throttling hole is in communication with the oil port A; a right throttling groove is disposed between the oil port B and the oil port I/R; a right oil-returning hole assembly composed of a right first throttling hole, a right second throttling hole and a right third throttling hole is disposed between the right oil port T and the oil port I/R; and both the right second throttling hole and the right third throttling hole are in communication with the oil port B.

A left first circular groove, a left second circular groove, a left first seal groove and a left second seal groove are disposed on the circumference of the left valve seat described in the aforesaid technical solution, and a left valve seat central hole is disposed on the central line of the left valve seat; the left first circular groove is in communication with the left valve seat central hole via a left valve seat radial hole that is disposed radially; and each of the left first seal groove and the left second seal groove is provided with a left seal ring; and a right first circular groove, a right second circular groove, a right first seal groove and a right second seal groove are disposed on the circumference of the right valve seat, and a right valve seat central hole is disposed on the central line of the right valve seat; the right first circular groove is in communication with the right valve seat central hole via a right valve seat radial hole that is disposed radially; and each of the right first seal groove and the right second seal groove is provided with a right seal ring.

A left spring hole and a left cone valve core hole that are in communication with each other are disposed on the central line of the left cone valve core described in the aforesaid technical solution, and a left shoulder with a radial circular surface is provided at the right end of the left cone valve core; a left shoulder radial hole is disposed along a radial direction of the left shoulder, and the right end of the left shoulder is provided with a left shoulder conical surface; the left shoulder radial hole is in communication with the left cone valve core hole; and the angle of the left shoulder conical surface is smaller than the angle of the frustum holes; and a right spring hole and a right cone valve core hole that are in communication with each other are disposed on the central line of the right cone valve core, a right shoulder with a radial circular surface is provided at the right end of the right cone valve core; a right shoulder radial hole is disposed along a radial direction of the right shoulder, and the right end of the right shoulder is provided with a right shoulder conical surface; the right shoulder radial hole is in communication with the right cone valve core hole; and the angle of the right shoulder conical surface is smaller than the angle of the frustum holes.

An upper left pressure-releasing slant hole and a lower left pressure-releasing slant hole are disposed symmetrically near the left oil port T described in the aforesaid technical solution; and an upper right pressure-releasing slant hole and a lower right pressure-releasing slant hole are disposed symmetrically near the right oil port T.

After adopting the aforesaid technical solution, the present disclosure has the following benefits:

the present disclosure can be applied to loader boom cylinders, excavator booms, bucket arm cylinders, etc., and during the downward movement of the piston, the falling speed of the piston can be restricted and the potential energy generated by the gravity action of the mechanism and the material on the piston can be utilized to achieve energy recycling.

BRIEF DESCRIPTION OF THE DRAWINGS

Hereinafter, the present disclosure will be further detailed according to specific embodiments and with reference to attached drawings so that the contents of the present disclosure are more readily and clearly appreciated.

Figure 1:
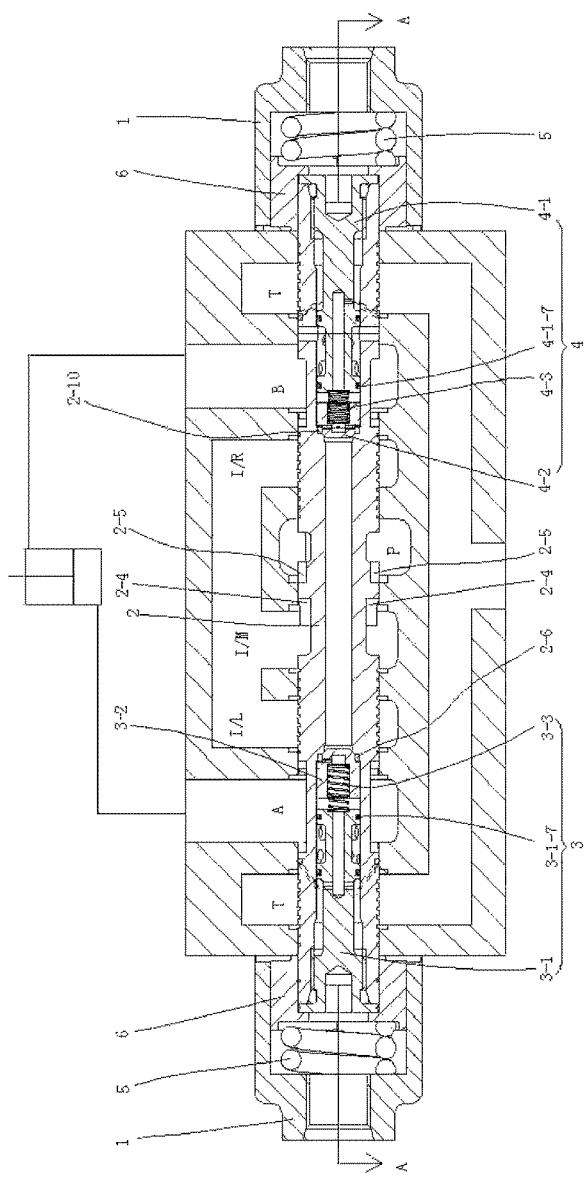
FIG. 1 is a schematic structural view of the present disclosure.

Reference numerals in the attached drawings are: end cover 1, valve core 2, thick central hole 2-1, thin central hole 2-2, frustum hole 2-3, left oil-feeding throttling groove 2-4, right oil-feeding throttling groove 2-5, left throttling groove 2-6, left first throttling hole 2-7, left second throttling hole 2-8, left third throttling hole 2-9, right throttling groove 2-10, right first throttling hole 2-11, right second throttling hole 2-12, right third throttling hole 2-13, left one-way valve 3, left valve seat 3-1, left first circular groove 3-1-1, left second circular groove 3-1-2, left first seal groove 3-1-3, left second seal groove 3-1-4, left valve seat central hole 3-1-5, left valve seat radial hole 3-1-6, left seal ring 3-1-7, left cone valve core 3-2, left spring hole 3-2-1, left cone valve core hole 3-2-2, left shoulder 3-2-3, left shoulder radial hole 3-2-4, left spring 3-3, right one-way valve 4, right valve seat 4-1, right first circular groove 4-1-1, right second circular groove 4-1-2, right first seal groove 4-1-3, right second seal groove 4-1-4, right valve seat central hole 4-1-5, right valve seat radial hole 4-1-6, right seal ring 4-1-7, right cone valve core 4-2, right spring hole 4-2-1, right cone valve core hole 4-2-2, right shoulder 4-2-3, right shoulder radial hole 4-2-4, right spring 4-3, spring 5, spring seat 6, left pressure-releasing slant hole 7, right pressure-releasing slant hole 8

DETAILED DESCRIPTION OF THE INVENTION

Embodiment 1

Referring to FIG. 1, an energy-recycling hydraulic control main valve comprises end covers 1, a valve core 2, a left one-way valve 3 and a right one-way valve 4; each of two ends of the valve core 2 is provided with one end cover 1, the valve core 2 is provided with a left oil port T, a first oil port A, a second oil port I/L, a third oil port I/M, a fourth oil port I/R, a fifth oil port B, a right oil port T and a sixth oil port P thereon; a spring 5 and a spring seat 6 are arranged between each of the end covers 1 and the valve core 2; the left one-way valve 3 and the right one-way valve 4 are respectively embedded in the left end and the right end of the valve core 2; the left one-way valve 3 is composed of a left valve seat 3-1, a left cone valve core 3-2 and a left spring 3-3; a conical surface of the left cone valve core 3-2 is closely attached to a left conical surface of the valve core 2 by the action of the left spring 3-3; the right one-way valve 4 is composed of a right valve seat 4-1, a right cone valve core 4-2 and a right spring 4-3; and a conical surface of the right cone valve core 4-2 is closely attached to a right conical surface of the valve core 2 by the action of the right spring 4-3. An upper left pressure-releasing slant hole and a lower left pressure-releasing slant hole 7 are disposed symmetrically near the left oil port T; and an upper right pressure-releasing slant hole and a lower right pressure-releasing slant hole 8 are disposed symmetrically near the right oil port T.

Figure 2:
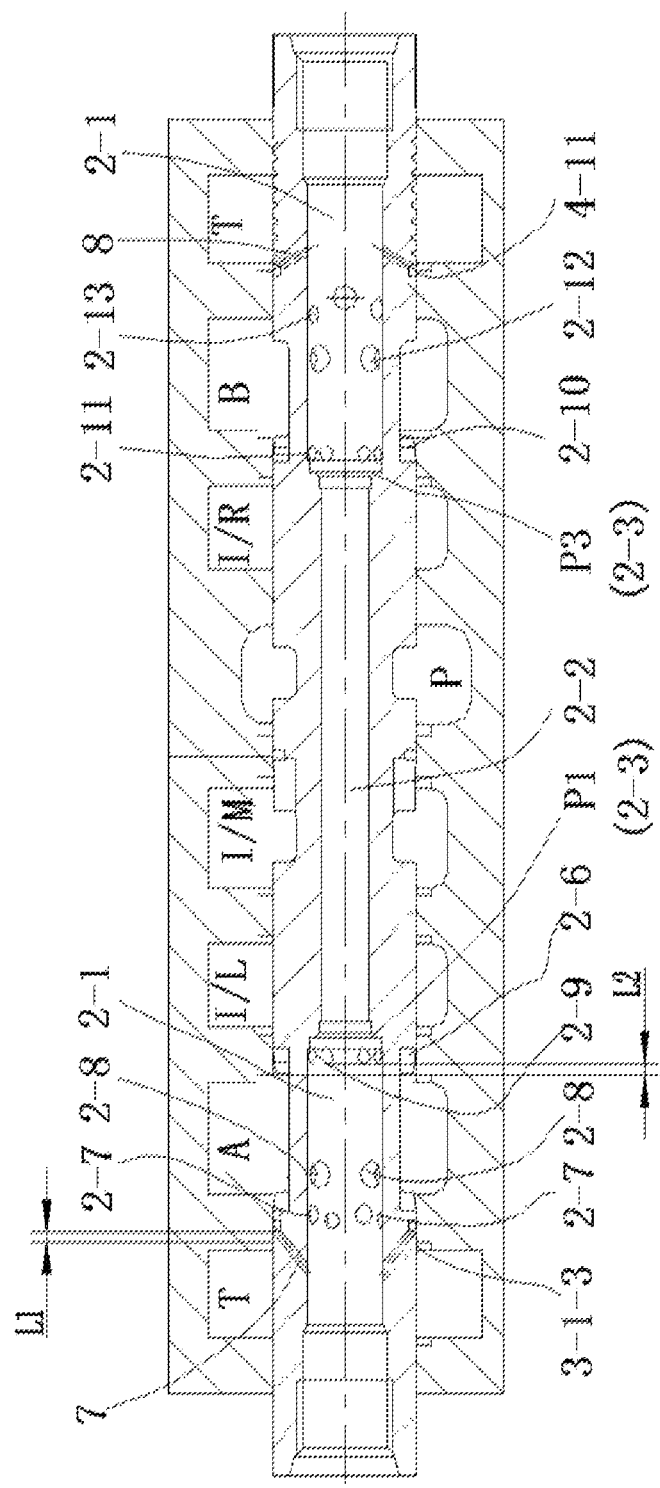
FIG. 2 is a schematic structural view of a valve core of the present disclosure.

Referring to FIG. 2, a left thick central hole (a left first central hole) and a right thick central hole (a right first central hole) 2-1 are disposed symmetrically on the central line of the valve core 2; the two thick central holes 2-1 are in communication with each other via a thin central hole (a second central hole which diameter is smaller than those of the two first central holes) 2-2, and frustum holes 2-3 are respectively formed at junctions of the thin central hole 2-2 and each of the thick central holes 2-1; a left oil-feeding throttling groove 2-4 and a right oil-feeding throttling groove 2-5 are disposed between the oil port P and the oil port I/M; a left throttling groove 2-6 is disposed between the oil port A and the oil port I/L; a left oil-returning hole assembly composed of a left first throttling hole 2-7, a left second throttling hole 2-8 and a left third throttling hole 2-9 is disposed between the left oil port T and the oil port I/L; the left second throttling hole 2-8 is in communication with the oil port A; a right throttling groove 2-10 is disposed between the oil port B and the oil port I/R; a right oil-returning hole assembly composed of a right first throttling hole 2-11, a right second throttling hole 2-12 and a right third throttling hole 2-13 is disposed between the right oil port T and the oil port I/R; and both the right second throttling hole 2-12 and the right third throttling hole 2-13 are in communication with the oil port B.

Figure 3:
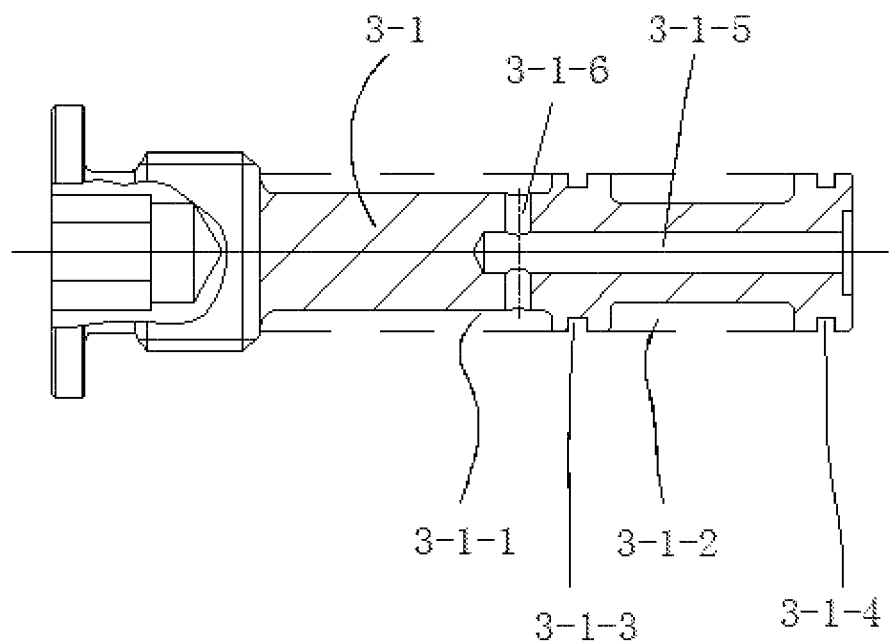
FIG. 3 is a schematic structural view of a left valve seat of the present disclosure.

Referring to FIG. 3, a left first circular groove 3-1-1, a left second circular groove 3-1-2, a left first seal groove 3-1-3 and a left second seal groove 3-1-4 are disposed on the circumference of the left valve seat 3-1, and a left valve seat central hole 3-1-5 is disposed on the central line of the left valve seat 3-1; the left first circular groove 3-1-1 is in communication with the left valve seat central hole 3-1-5 via two left valve seat radial holes 3-1-6 that are disposed radially; and each of the left first seal groove 3-1-3 and the left second seal groove 3-1-4 is provided with a seal ring 3-1-7.

Figure 5:
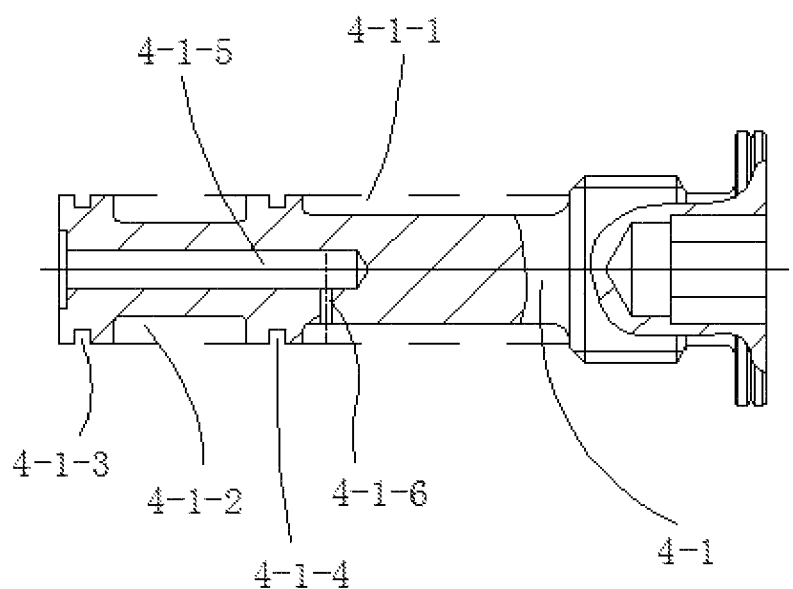
FIG. 5 is a schematic structural view of a right valve seat of the present disclosure.

Referring to FIG. 5, a right first circular groove 4-1-1, a right second circular groove 4-1-2, a right first seal groove 4-1-3 and a right second seal groove 4-1-4 are disposed on the circumference of the right valve seat 4-1, and a right valve seat central hole 4-1-5 is disposed on the central line of the right valve seat 4-1; the right first circular groove 4-1-1 is in communication with the right valve seat central hole 4-1-5 via a right valve seat radial hole 4-1-6 that is disposed radially; and each of the right first seal groove 4-1-3 and the right second seal groove 4-1-4 is provided with a seal ring 4-1-7.

Figure 4:
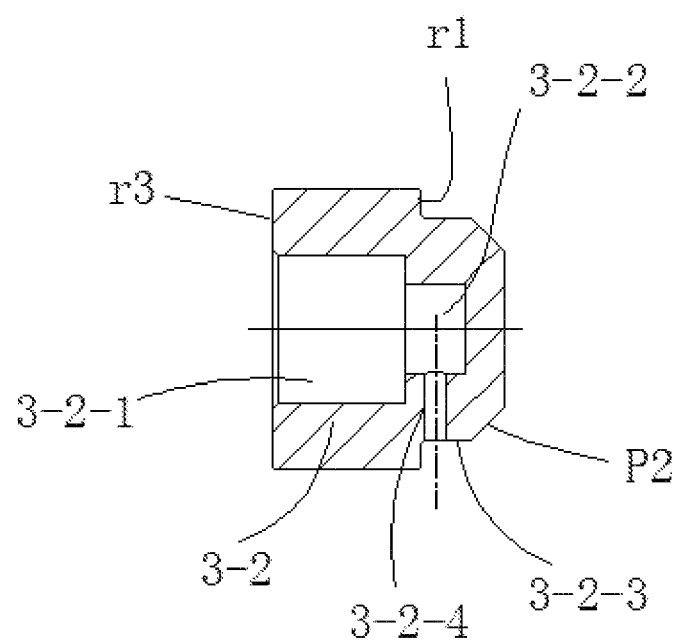
FIG. 4 is a schematic structural view of a left cone valve core of the present disclosure.

Referring to FIG. 4, a left spring hole 3-2-1 and a left cone valve core hole 3-2-2 that are in communication with each other are disposed on the central line of the left cone valve core 3-2, a left shoulder 3-2-3 with a radial circular surface is provided at the right end of the left cone valve core 3-2; a left shoulder radial hole 3-2-4 is disposed along a radial direction of the left shoulder 3-2-3, and the right end of the left shoulder 3-2-3 is provided with a left shoulder conical surface; the left shoulder radial hole 3-2-4 is in communication with the left cone valve core hole 3-2-2; and the angle of the left shoulder conical surface is smaller than the angle of the frustum holes.

Figure 6:
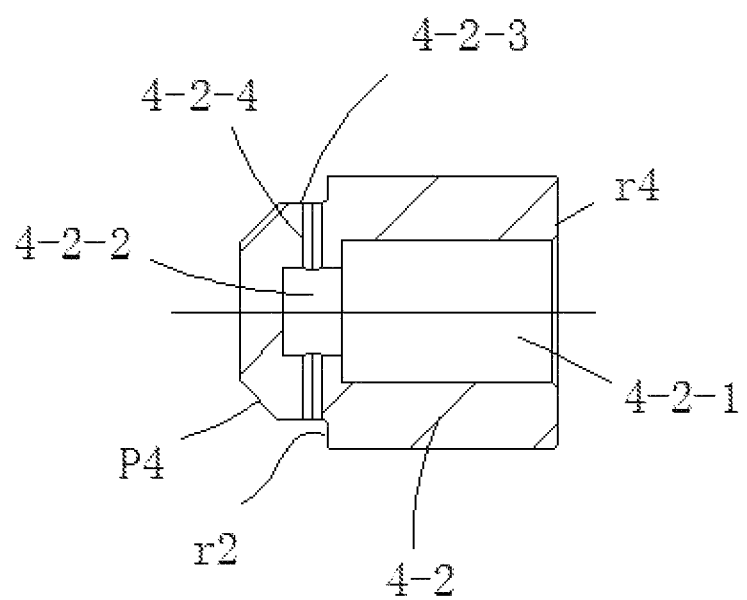
FIG. 6 is a schematic structural view of a right cone valve core of the present disclosure.

Referring to FIG. 6, a right spring hole 4-2-1 and a right cone valve core hole 4-2-2 that are in communication with each other are disposed on the central line of the right cone valve core 4-2, a right shoulder 4-2-3 with a radial circular surface is provided at the right end of the right cone valve core 4-2; two right shoulder radial holes 4-2-4 are disposed along a radial direction of the right shoulder 4-2-3, and the right end of the right shoulder 4-2-3 is provided with a right shoulder conical surface; the right shoulder radial holes 4-2-4 are in communication with the right cone valve core hole 4-2-2; and the angle of the right shoulder conical surface is smaller than the angle of the frustum holes.

After the left one-way valve 3 and the right one-way valve 4 are respectively installed at the two ends of the valve core 2, the two left seal rings 3-1-7 respectively isolate the left first circular groove 3-1-1 from the left second circular groove 3-1-2, and isolate the left second circular groove 3-1-2 from the left throttling groove 2-6; the two right seal rings 4-1-7 respectively isolate the right first circular groove 4-1-1 from the right second circular groove 4-1-2, and isolate the right second circular groove 4-1-2 from the right throttling groove 2-10; the positive overlap amount between the left third throttling hole 2-9 and the valve body is L2, and the positive overlap amount between the left pressure-releasing slant hole 7 and the valve body is L1; the left third throttling hole 2-9, the left throttling groove 2-6, the left cone valve core hole 3-2-2, the left shoulder radial hole 3-2-4, the left valve seat central hole 3-1-5, the two left valve seat radial holes 3-1-6, and the left pressure-releasing slant hole 7 are in communication to form a channel; and the right first throttling hole 2-11, the right throttling groove 2-10, the right shoulder radial hole 4-2-4, the right cone valve core hole 4-2-2, the right valve seat central hole 4-1-5, the right valve seat radial hole 4-1-6, and the right pressure-releasing slant hole 8 are also in communication to form a channel.

Figure 7:
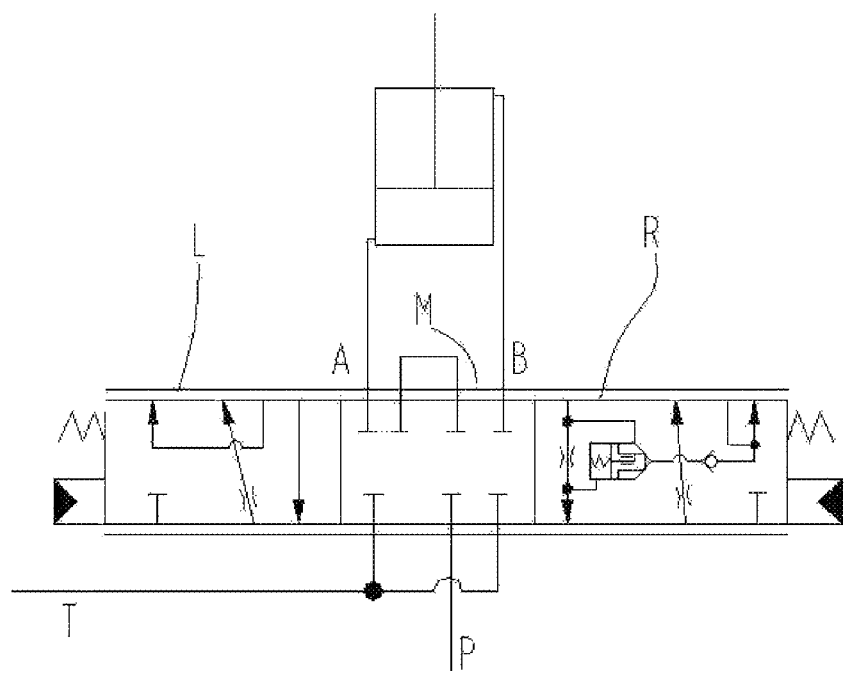
FIG. 7 is a structural functional view of the present disclosure.

Referring to FIG. 7, the working principle of the present disclosure is as follows.

When the valve core 2 is switched to the L position, the oil fluid flows from the oil port P through the oil-feeding throttling groove 2-4 to the oil port I/L, and then flows into the oil port A through the throttling groove 2-6; and meanwhile, part of the oil fluid can flow from the oil port I/L through the left third throttling hole 2-9 to the left throttling groove 2-6; the oil fluid flows from the left shoulder radial hole 3-2-4 and is in communication with the left cone valve core hole 3-2-2, the left valve seat central hole 3-1-5, the left valve seat radial hole 3-1-6, the left first circular groove 3-1-1, and the left pressure-releasing slant hole 7 and is then blocked; the pressure at the oil port I/L is equal to the pressure at the left pressure-releasing slant hole 7; and a circular section r3 of the left cone valve core 3-2 is much greater than a circular surface r1, so the conical surface of the left cone valve core 3-2 is pushed towards and closely attached to the conical surface of the valve core 2, and the oil fluid from the oil port P reliably acts on the non-rod chamber of the oil cylinder to push the piston of the oil cylinder to move upward. The oil fluid in the piston chamber of the oil cylinder flows back to the oil port B, flows into the right second throttling hole 2-12 and the right first circular groove 4-1-1, and flows to the oil port T through the right third throttling hole 2-13; and another part of the oil fluid can flow from the oil port B through the right first throttling hole 2-11 to the right throttling groove 2-10, the right shoulder radial hole 4-2-4, the right cone valve core hole 4-2-2 and the right valve seat central hole 4-1-5, and finally flows to the oil port T through the right pressure-releasing slant hole 8. During this process, the conical surface of the right cone valve core 4-2 is closely attached to the conical surface of the valve core 2.

When the valve core 2 is switched to the R position, the oil fluid flows from the oil port P through the right oil-feeding throttling groove 2-5 to the oil port I/R, and then flows into the oil port B through the right throttling groove 2-10; and meanwhile, part of the oil fluid can flow from the oil port I/R through the right first throttling hole 2-11 to the right throttling groove 2-10; then the oil fluid flows from the two right shoulder radial holes 4-2-4 and is in communication with the right cone valve core hole 4-2-2, the right valve seat central hole 4-1-5, the right valve seat radial hole 4-1-6, the right second circular groove 4-1-2 and the right pressure-releasing slant hole 8, and finally flows into the oil tank; and the area of the two right shoulder radial hole 4-2-4 is larger than that of the right valve seat radial hole 4-1-6, so this part of the oil fluid only substantially generates the same pressure at the front end of the right valve seat radial hole 4-1-6. Since the hydraulic pressure acting on a circular section r4 of the right cone valve core 4-2 and a circular surface r2 of the right cone valve core 4-2, together with the right spring 4-3 all push the conical surface P2 of the right cone valve core 4-2 towards the conical surface P4 of the valve core 2 to be closely attached to the conical surface P4 of the valve core 2, the oil fluid from the oil port P only acts on the rod chamber of the piston of the oil cylinder to push the piston of the oil cylinder to move downward.

The oil fluid in the piston chamber of the oil cylinder flows back to the oil port A, flows into the left second throttling hole 2-8 and the left second circular groove 3-1-2, and flows to the oil port T through the left first throttling hole 2-7; by limiting the open area of the left first throttling hole 2-7, a backpressure p1 is generated in the left first throttling hole 2-7 by the returning oil to avoid unrestricted falling of the piston; and meanwhile, another part of the oil fluid can flow from the oil port A through left third throttle hole 2-9 and the left shoulder radial hole 3-2-4, flow into the left spring hole 3-2-1, then through the left valve seat central hole 3-1-5, two left valve seat radial holes 3-1-6 and the left first circular groove 3-1-1, and finally flow to the oil port T through the left pressure-releasing slant hole 7. Because the area of the left shoulder radial hole 3-2-4 is much smaller than two left valve seat radial holes 3-1-6, so the main pressure drop is generated on the left shoulder radial hole 3-2-4, and the pressure in the left valve seat central hole 3-1-5 generated by the oil fluid that flows back to T port through two left valve seat radial holes 3-1-6 is almost zero, that means the backpressure p1 acts on the right end surface r1 of the left cone valve core 3-2 to overcome the force of the left spring 3-3 so that the conical surface P2 of the left cone valve core 3-2 is separated from the conical surface P1 of the valve core 2. Thus, the oil fluid can flow into the thin central line 2-2 and open the right core valve cone, then flow through the right first throttling hole 2-11, and finally flow into the oil port B and push the piston to move downward together with the oil fluid from the oil port P, thereby achieving energy recycling and reducing the necessary power of the motor. When the falling speed is relatively slow, the backpressure p1 cannot push the right end surface of the left cone valve core 3-2 to overcome the force of the left spring 3-3 4-3 so as to separate the conical surface P2 of the left cone valve core 3-2 from the conical surface P1 of the valve core 2, so this will not influence the micro-operation of the oil cylinder.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. An energy-recycling hydraulic control main valve, comprising end covers (1), a valve core (2), a left one-way valve (3) and a right one-way valve (4); wherein each of two ends of the valve core (2) is provided with one end cover (1), the valve core (2) is provided with a left oil port, a first oil port (A), a second oil port (I/L), a third oil port (I/M), a fourth oil port (I/R), a fifth oil port (B), a right oil port and a sixth oil port (P) thereon; a spring (5) and a spring seat (6) are arranged between each of the end covers (1) and the valve core (2); the left one-way valve (3) and the right one-way valve (4) are respectively embedded in the left end and the right end of the valve core (2); the left one-way valve (3) is composed of a left valve seat (3-1), a left cone valve core (3-2) and a left spring (3-3); a conical surface of the left cone valve core (3-2) is closely attached to a left conical surface of the valve core (2) by the action of the left spring (3-3); the right one-way valve (4) is composed of a right valve seat (4-1), a right cone valve core (4-2) and a right spring (4-3); and a conical surface of the right cone valve core (4-2) is closely attached to a right conical surface of the valve core (2) by the action of the right spring (4-3);

wherein a left first central hole and a right first central hole (2-1) are disposed on the central line of the valve core (2); the two first central holes (2-1) are in communication with each other via a second central hole (2-2) which diameter is smaller than diameters of the two first central holes (2-1), and frustum holes (2-3) are respectively formed at junctions of the second central hole (2-2) and each of the first central holes (2-1); a left oil-feeding throttling groove (2-4) and a right oil-feeding throttling groove (2-5) are disposed between the sixth oil port (P) and the third oil port (I/M); a left throttling groove (2-6) is disposed between the first oil port (A) and the second oil port (I/L); a left oil-returning hole assembly composed of a left first throttling hole (2-7), a left second throttling hole (2-8) and a left third throttling hole (2-9) is disposed between the left oil port and the second oil port (I/L); the left second throttling hole (2-8) is in communication with the first oil port (A); a right throttling groove (2-10) is disposed between the fifth oil port (B) and the fourth oil port (I/R); a right oil-returning hole assembly composed of a right first throttling hole (2-11), a right second throttling hole (2-12) and a right third throttling hole (2-13) is disposed between the right oil port and the fourth oil port (I/R); and both the right second throttling hole (2-12) and the right third throttling hole (2-13) are in communication with the fifth oil port (B).

2. The energy-recycling hydraulic control main valve of claim 1, wherein a left first circular groove (3-1-1), a left second circular groove (3-1-2), a left first seal groove (3-1-3) and a left second seal groove (3-1-4) are disposed on the circumference of the left valve seat (3-1), and a left valve seat central hole (3-1-5) is disposed on the central line of the left valve seat (3-1); the left first circular groove (3-1-1) is in communication with the left valve seat central hole (3-1-5) via two left valve seat radial holes (3-1-6) that are disposed radially; and each of the left first seal groove (3-1-3) and the left second seal groove (3-1-4) is provided with a left seal ring (3-1-7); and a right first circular groove (4-1-1), a right second circular groove (4-1-2), a right first seal groove (4-1-3) and a right second seal groove (4-1-4) are disposed on the circumference of the right valve seat (4-1), and a right valve seat central hole (4-1-5) is disposed on the central line of the right valve seat (4-1); the right first circular groove (4-1-1) is in communication with the right valve seat central hole (4-1-5) via a right valve seat radial hole (4-1-6) that is disposed radially; and each of the right first seal groove (4-1-3) and the right second seal groove (4-1-4) is provided with a right seal ring (4-1-7).

3. The energy-recycling hydraulic control main valve of claim 2, wherein a left spring hole (3-2-1) and a left cone valve core hole (3-2-2) that are in communication with each other are disposed on the central line of the left cone valve core (3-2), a left shoulder (3-2-3) with a radial circular surface is provided at the right end of the left cone valve core (3-2); a left shoulder radial hole (3-2-4) is disposed along a radial direction of the left shoulder (3-2-3), and the right end of the left shoulder (3-2-3) is provided with a left shoulder conical surface; the left shoulder radial hole (3-2-4) is in communication with the left cone valve core hole (3-2-2); and the angle of the left shoulder conical surface is smaller than the angle of the frustum holes; and a right spring hole (4-2-1) and a right cone valve core hole (4-2-2) that are in communication with each other are disposed on the central line of the right cone valve core (4-2), a right shoulder (4-2-3) with a radial circular surface is provided at the right end of the right cone valve core (4-2); two right shoulder radial holes (4-2-4) are disposed along a radial direction of the right shoulder (4-2-3), and the right end of the right shoulder (4-2-3) is provided with a right shoulder conical surface; the right shoulder radial holes (4-2-4) are in communication with the right cone valve core hole (4-2-2); and the angle of the right shoulder conical surface is smaller than the angle of the frustum holes.

4. The energy-recycling hydraulic control main valve of claim 3, wherein two left pressure-releasing slant holes (7) are disposed near the left oil port; and two right pressure-releasing slant holes (8) are disposed near the right oil port.

* * * * *